United States Patent [19]
Ventrone et al.

[11] Patent Number: 5,765,868
[45] Date of Patent: Jun. 16, 1998

[54] PORTABLE ACCESSORY CONTAINER

[76] Inventors: Jon E. Ventrone; Terri L. Ventrone, both of 710 Guilford Blvd., Medina, Ohio 44256

[21] Appl. No.: 607,110

[22] Filed: Feb. 26, 1996

[51] Int. Cl.[6] ............................................. B60R 9/06
[52] U.S. Cl. ........................... 280/769; 220/482; 224/526; 224/411; 211/88; 280/47.35; 280/87.01
[58] Field of Search .......................... 280/87.043, 769, 280/87.01, 33.992, 47.35, 47.38; 220/23.4, 482, 8; 224/526, 527, 524, 525, 408, 409, 410, 411, 430; 211/88

[56] References Cited

U.S. PATENT DOCUMENTS

| | | | |
|---|---|---|---|
| 2,527,434 | 10/1950 | Little et al. | 280/47.38 |
| 2,558,372 | 6/1951 | Nidermayer, Jr. | 224/409 |
| 2,616,599 | 11/1952 | Hryhorczuk | 224/526 |
| 2,671,671 | 3/1954 | Kupfer | 224/609 |
| 2,763,413 | 9/1956 | Felton | 224/411 |
| 2,831,598 | 4/1958 | Slavsky et al. | 220/482 |
| 4,048,754 | 9/1977 | Laux | 47/68 |
| 4,160,570 | 7/1979 | Bridges | 312/245 |
| 4,854,466 | 8/1989 | Lane, Jr. | 220/23.83 |
| 4,865,346 | 9/1989 | Carlile | 280/654 |
| 4,880,133 | 11/1989 | Cullinane | 220/85 H |
| 4,889,267 | 12/1989 | Bolton | 224/565 |
| 4,916,917 | 4/1990 | Jackson, Jr. | 211/88 |
| 5,044,650 | 9/1991 | Eberle, Jr. | 280/47.38 |
| 5,064,090 | 11/1991 | Farrier | 220/482 |
| 5,092,487 | 3/1992 | Richer et al. | 220/482 |
| 5,097,975 | 3/1992 | Waterston et al. | 220/22.83 |
| 5,279,603 | 1/1994 | Everett et al. | 604/322 |
| 5,294,194 | 3/1994 | Lombardo | 312/229 |
| 5,427,394 | 6/1995 | Lauto | 280/47.35 |
| 5,480,170 | 1/1996 | Kaiser, II | 280/30 |

FOREIGN PATENT DOCUMENTS

| | | | |
|---|---|---|---|
| 619186 | 2/1977 | Switzerland | 280/33.992 |

*Primary Examiner*—Brian L. Johnson
*Assistant Examiner*—Avraham H. Lerner
*Attorney, Agent, or Firm*—Oldham & Oldham Co., LPA

[57] ABSTRACT

A portable accessory container for mounting on a supporting structure, such as a rear wall of a hand-drawn wagon. The container comprises a receptacle portion for carrying articles and an attachment or mounting portion for attachment to a supporting structure, such as a vertical wall. The receptacle portion is preferably an open-top structure having a horizontal bottom wall and four vertical side walls, which may be either slatted or imperforate. The attachment or mounting portion may comprise either a pair of spaced hooks or an inverted U-shaped sheet attached to the receptacle portion. Either hooks or an inverted U-shaped sheet are adapted to extend over an upper edge of a rear wall of a hand-drawn. A container assembly comprising a container mounted on a wagon provides appreciably more storage space for articles than does the wagon alone. Various modifications and improvements are possible. For example, the receptacle may be made in two section for convenience in storage and for some adjustability in the carrying capacity of the receptacle. The receptacle may be provided with structures; such as feet or wheels, which will prevent tipping over in case the load carried by the receptacle is large in comparison to the load carried in the wagon.

19 Claims, 6 Drawing Sheets

5,765,868

1

PORTABLE ACCESSORY CONTAINER

TECHNICAL FIELD

This invention relates to a portable accessory container for mounting on a vertical support surface, and more particularly to a portable accessory container for mounting on a side wall of a wagon or other vehicle.

BACKGROUND ART

Wagons or similar types of vehicles have long been used by children as a play toys and by parents to take their children on wagon rides around the neighborhood. A wide variety of wagons are therefore available on the market, but each essentially includes a box-type body having a bottom wall and side walls extending upwardly therefrom. The body is situated on four wheels positioned on a pair of axles at the front and back of the body. A handle may be used to pull the wagon. This construction allows one or more small children to sit in the wagon, which allows the parents to move about more freely and quickly as well as providing enjoyment for the children. More commonly these days, the wagon is used to transport children in a variety of environments, such as amusement parks or other outdoor or other venues which may require extensive walking. In these situations, parents may also have a variety of baggage or other "stuff" that is brought along, and have a hard time carrying all the "stuff" if the children are sitting in the wagon. It would be extremely beneficial to these situations if there were provided an accessory container which could be used in conjunction with the wagon to carry any of a variety of articles.

Although containers which can be supported on a wall or other vertical support surfaces have been developed for particular uses, such containers would not generally be usable in conjunction with a wagon or for carrying articles in association with such a vehicle. Also, the known containers are generally fixed to a stationary support surface and thus use specialized mounting structures which take a variety of different forms as with the vertical support surface. There thus remains a need to provide a container for mounting on a vertical support surface such as the wall of a hand-drawn wagon or the like for convenience in carrying articles or to provide other desired conveniences. There also is a need to provide a portable accessory container which is easily handled and used, and which is adaptable to a variety of support surfaces.

SUMMARY OF THE INVENTION

This invention is therefore directed to a portable accessory container for mounting on a vertical support member which has opposite first and second sides and an upper edge, wherein the container comprises a receptacle including an essentially horizontal bottom wall and at least one upstanding side wall extending upwardly from and around a periphery of the bottom wall and terminating at a top edge. The bottom and side walls define an interior space for receipt of articles. There is also provided mounting means for detachably mounting the container on a vertical support member, wherein the mounting means comprise a hook member extending outwardly from an upper portion of a side wall.

More particularly the mounting means may comprise a pair of hook members, each hook including a horizontal portion extending from an outside surface of the side wall, and a downwardly extending vertical portion which extends downwardly from the horizontal portion in spaced relation to the side wall. The horizontal portion may include a rigid member which is integrally joined to a receptacle wall. The container is adapted to be mounted on a support member and a downwardly extending portion of each hook is disposed on opposite sides of the support member, and the horizontal portion of each hook extends above the upper edge of the vertical support member. The vertical support member is preferably a rear wall or a longitudinally extending side wall of a hand-drawn wagon for outdoor use. The container may include means to adjust to variable support surfaces, and be selectively firmly secured thereto for use. The invention also contemplates providing a variable size receptacle, or a modularized container having a variety of components which may be selectively attached to one another in desired configurations.

BRIEF DESCRIPTION OF THE DRAWINGS

This invention will now be described in further detail with reference to preferred embodiments thereof as shown in the accompanying drawings, in which.

DESCRIPTION OF THE PREFERRED EMBODIMENT

Figure 1:
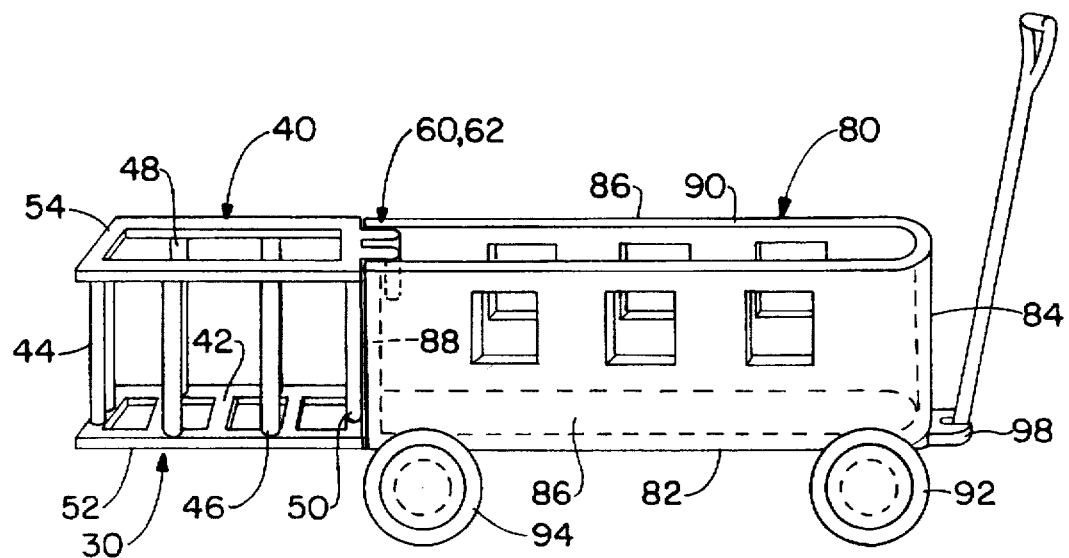
FIG. 1 is a perspective view showing a wagon and an accessory container according to a first embodiment of this invention mounted thereon.
Figure 2:
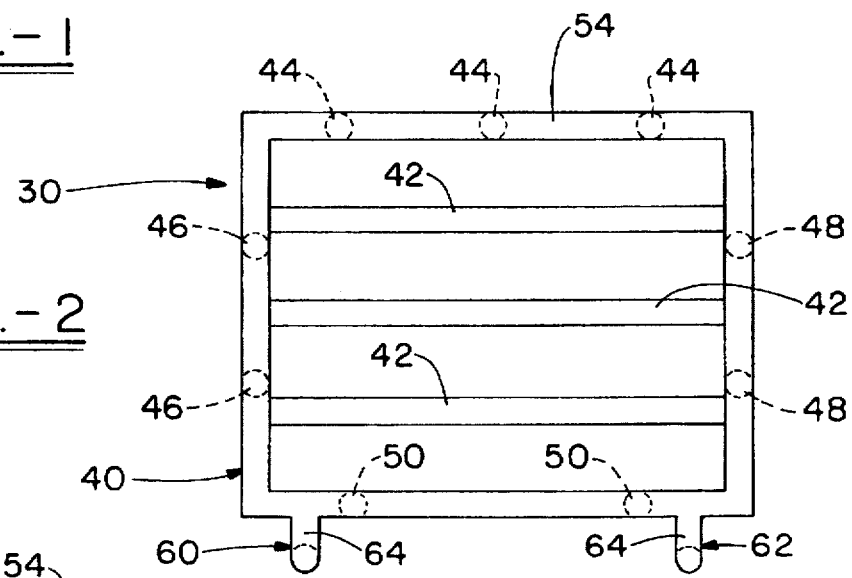
FIG. 2 is a top view of the container shown in FIG. 1.
Figures 3, 4:
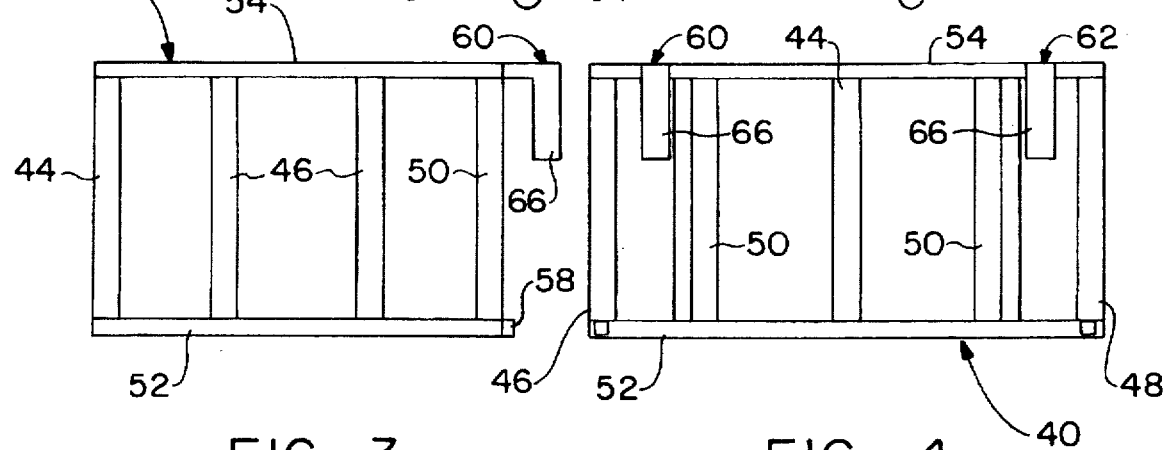
FIG. 3 is a side view of the container shown in FIG. 1.
FIG. 4 is a rear view of the container of FIG. 1.

A first embodiment of the present invention will be described with particular reference to FIGS. 1–4. An assembly according to a first embodiment of this invention may comprise a container 30, wherein the container 30 comprises a receptacle portion 40 and a mounting or attachment portion 60. The attachment portion 60 can be removably mounted on a substantially vertical side wall, which as shown is preferably a back wall of a hand-drawn wagon 80. As shown in FIG. 1, the container receptacle portion 40 is disposed outboard of the wagon 80 for use. The general structure of the wagon may be conventional, and such wagons may include those having metal bodies or the more recent wagons which are molded from plastic. Although the wagon in general terms is conventional, the commercially available wagons can vary to a great extent in their actual configurations, particularly with respect to molded wagons. For example, the side walls of a wagon may vary as to width, height, shape or in other ways. The embodiment as shown in these Figures is designed to accommodate a variety of wall configurations so as to be readily usable with a variety of wagons.

Container 30 may comprises a receptacle portion 40 of open frame or fence construction and of generally rectangular shape. A bottom wall 42 may be formed by spaced parallel horizontal slats, and four side walls, i.e., a front wall 44, opposite longitudinally extending side walls 46 and 48, and a rear wall 50, all formed by spaced vertical slats. Each of the walls 42, 44, 46, 48, and 50 may be formed by a plurality (i.e., 2 or more) or set of co-planar slats. The front wall 44 and the rear wall 50 extend transversely. The receptacle portion 40 further includes a horizontal rectangular (or four-sided) bottom edge 52, which may be formed as a frame member disposed along the periphery of the bottom wall 42 at the intersection of the bottom wall with each of the upstanding side walls 44, 46, 48 and 50. Similarly, a horizontal rectangular top edge or rim 54 may also be formed as a frame member extending around a perimeter of the receptacle portion 40 and marking the upper extent of each of the side walls 44, 46, 48 and 50. The slats forming each of the side walls 44, 46, 48 and 50 extend from the bottom edge 52 to the top edge 54. Receptacle portion 40 is open at the top.

It will be noted that this embodiment does not have any corner posts or vertical slats positioned at the corners of the bottom of frame member 52 and top edge or rim 54. Rather, each of the vertical walls has a slat positioned close to but not precisely at the corners of bottom frame member 52 and top rim 54. While this embodiment has been shown without any corner posts, it will be appreciated that the structure illustrated may be modified by including vertical corner posts, if desired. It will be further appreciated that the positioning of and distance between both horizontal slats (in the bottom wall 42) and vertical slats (in the side walls) is a matter of choice and it is necessary only to provide slats close enough together so that desired objects to be carried in the receptacle portion of a container do not fall through the openings between adjacent slats. Further, the number of slats may be changed to provide varying degrees of support or structural strength. The frame members 52 and 54, and the slats forming walls 42, 44, 46, 48, and 50, may be either solid or hollow (i.e., tubular), and may be of either of round, rectangular (including square) or other cross-sectional shapes. The use of an open frame construction as shown in this embodiment may facilitate positioning on particular types of wagons, such as that shown in FIG. 1, which has a curved end wall which could extend slightly through adjacent slats in end wall 50 of the container 30, providing lateral stability to the container 30 when mounted on wagon 80.

In the preferred embodiment, extending outwardly and horizontally from the bottom edge 52 and specifically from the rear portion thereof are a pair of bumpers 58, which are adapted to engage a wall or other surface of wagon 80 as an aid in positioning the container 30 so that the bottom wall 42 of the receptacle portion 40 is horizontal as well also providing lateral stability to the container 30 when mounted on wagon 80.

The mounting or attachment portion 60 of container 30, which may also be referred to as mounting means, comprises in this embodiment a pair of spaced parallel hooks 62 each of which is integrally joined at one end to receptacle portion 40 and, more specifically, to the rear wall 50 of the receptacle portion 40. These hooks may be joined to the rear wall segments of top edge 54 inwardly from the ends of the rear segment and therefore inwardly spaced from the longitudinal side walls 46, 48. Each hook 62 comprises a horizontally and longitudinally extending portion 64, which extends outwardly away from the receptacle portion 40, and a vertically downwardly extending portion 66 which extends downwardly from an outer end of horizontal portion 64.

Receptacle portion 40 of container 30 is preferably rectangular or square in shape. The shape of receptacle portion 40 may be that of a rectangular prism as shown, having a horizontal bottom wall 42 and vertical side walls. However, side walls may be arranged to be steeply sloping upwardly and slightly outwardly, rather than absolutely vertical, so that a plurality of like containers 30 can be stacked in nesting relationship. In this manner, such containers could be provided at amusement parks or the like for rental, with the nesting relationship minimizing storage requirements.

The cross-sectional shape of receptacle portion 40 may be other than rectangular, as for example oval (elliptical) or kidney shaped. The latter is particularly useful when it is desired to match the contour of the rear wall 50 of the receptacle portion 40 to the shape of the wall on which the container is mounted, as for example, a rounded back wall of a wagon 80.

The container 30 may be formed of a rigid, strong molded thermoplastic, such as polyvinyl chloride (PVC). The container may be formed by conventional molding techniques. Other polymers which may be used include polystyrene, butadiene-styrene, styrene-acrylonitrile, and polyethylene, especially high-density polyethylene (HDPE). Molded thermoplastic containers 30 of this invention may have either solid or hollow slats and frame members; solid slats and frame members are preferred since they are easier to fabricate by molding techniques, and excessive weight is not a consideration. Alternatively, the slats and frame members forming a container 30 may be made of tubular steel (e.g., stainless steel) or other suitable materials. Tubular aluminum may also be used. Slats and frame members of container 30 are preferably tubular (i.e., hollow) when formed of metal, in order to avoid excessive weight.

A wagon 80 on which container 30 is mounted may be conventional. The wagon may be of a type intended primarily for outdoor recreational use (and therefore commonly sold in toy stores and toy departments of department stores). However, such wagons are also useful for utilitarian purposes, particularly for carrying objects for outdoor use including but not limited to gardens. There are also commercially available other types of wheeled apparatus designed specifically for lawn and garden care, such as wheelbarrow type vehicles, gardening stools or the like, with which the accessory container of the invention may be advantageously used. For a particular type of vehicle or wheeled container, the size of the accessory container according to the invention can be adjusted to better fit such apparatus. For a wagon 80 of generally conventional configuration, it may comprise a horizontal floor 82, which may be of generally rectangular or elliptical shape. A plurality of upstanding side walls which include a front wall 84, longitudinally extending side walls 86 and a rear wall 88, extend upwardly from the perimeter of floor 82 and terminate in an upper edge or rim 90. The wagon 80 may further comprise a pair of front wheels 92 and a pair of rear wheels 94. The front wheels are typically mounted on a pivotable front axle assembly which is pivotally mounted on the underside of floor 82 by means of vertical pivot pin (not shown) located along the longitudinal center line of the wagon. The wagon typically also includes a tongue 98, attached to the front axle assembly for both pulling and steering the wagon. The rear wheels are typically rotatably mounted on a common, fixed horizontal rear axle. The wagon 80 may be large enough to permit a child or children to sit in it. Typical dimensions of wagon 80 may be as follows: overall length, about 30 to 36 inches; overall width, about 14 to 18 inches; and overall height, about 14 to 18 inches.

The wagon 80 illustrated in these Figures as with many molded plastic wagons may have an essentially elliptical floor 82 so that the longitudinal portions 86 and the rear portion 88 of the side wall structure flow into each other with no clear line of demarcation. Also, the longitudinal side wall portions are illustrated as having openings, but may be solid. However, other conventional wagons (such as illustrated with respect to subsequent embodiments of this invention) may have a rectangular floor and a side wall structure in which longitudinal side walls and a rear wall constitute distinct portions of the wall structure and which intersect at right angles.

The rear wall 50 of receptacle 40 may consist only of transverse sides or segments of upper and lower frame members 54 and 52, respectively, and a pair of vertical slats, both positioned near outward ends of these segments and extending from one frame member to the other. This leaves an open space through which an outwardly curved rear wall 88 of wagon 80 may extend slightly to accommodate the container 30 in closely adjacent relationship to the wagon 80 as previously mentioned. The wagon rear wall 88 also then essentially forms part of a supporting rear wall of the receptacle 40.

It will be noted that the receptacle portion 40 of container 30 is disposed on a first side, namely the outside, of rear wall 88 of wagon 80, and that the hooks 62 extend over the upper edge 90, with portions of these hooks (namely portion 66 in this embodiment) disposed on a second side, namely the inside, of the rear wall 88 of wagon 80. More broadly, other support structures besides a wall of a wagon may be used to support the container 30, and all such support structures (typically wall structures) will include opposite first and second sides and an upper edge.

The container 30 provides a useful adjunct to a wagon 80 when the latter is used for carrying children to allow easy transportation of other articles, such as toys, clothing or any other types of articles in association with the wagon 80. Further, if wagon 80 is used for other utilitarian purposes, as for example when carrying garden tools or tools used in home repair jobs, the container 30 not only increases the total carrying capacity, but also permits a useful separation of different types of articles being carried. Thus, for example, one may use the wagon 80 to carry garden tools, while using the receptacle portion 40 of container 30 to carry other articles, such as food and beverages.

Figure 5:
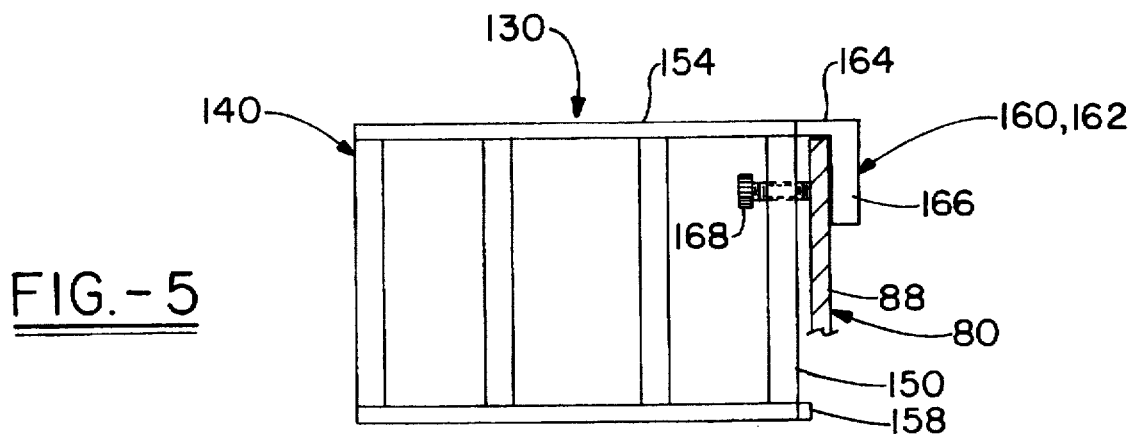
FIG. 5 is a side view of a container according to a second embodiment of this invention.

Referring now to FIG. 5, container 130, according to a second embodiment of this invention, comprises a generally rectangular receptacle portion 40 and an attachment portion or mounting means 160.

The receptacle portion 40 of container 130 may be preferably like the receptacle portion 40 of container 30 previously described. Accordingly, the same reference numerals are used, and the description of the receptacle portion will not be repeated in detail.

The attachment portion 160 of container 130 comprises a pair of parallel hooks 162, each of which includes a horizontal portion 164 extending longitudinally outwardly away from rear wall 150 and specifically from the rear side or segment of top rim 154, and a vertical portion 166 which extends downwardly from the respective ends of horizontal portions 164 which are remote from the receptacle 40. The respective horizontal portions 164 may each be integrally joined to the top edge of receptacle 40 or rim 54 at points which are spaced inwardly from the respective corners which mark the intersection of rear wall 50 with the side walls 46 and 48. It will be further noted that the horizontal portions 164 of hooks 162 may be positioned appreciably closer together than their counterparts 64 in FIGS. 1-4, and that the vertical portions 166 of hooks 162 engage an inside surface of a rear wall of wagon 80. The wagon 80 with which this embodiment may be used may again be typical, such as the wagon shown in FIG. 1. In this embodiment, the attachment portion 160 is also designed to facilitate use with any type of wagon or other vehicle or article having a vertical support surface. The attachment portion 160 as indicated may include hook members 162 having horizontal portions 164 which define in association with vertical portions 166 a downwardly facing channel designed to fit over a vertical support wall as described. In this embodiment, securing devices 168 may be provided in association with rear wall 50 to secure the vertical support wall within the channel as formed by hook members 162. The securing devices for example simply can be rotatable handles having a threaded post which is moved into and out of engagement with the supporting wall to lock the hook members 162 into engagement with the supporting surface. Alternatively, a spring biased post biased outwardly toward a supporting wall may be retracted to allow the channel to be positioned over a supporting wall, and thereafter released to engage the wall. Any other suitable securing mechanism is also contemplated in the invention. Further, the securing mechanism could be provided on vertical portions 166 or otherwise to secure container 30 to the support wall.

Figure 6:
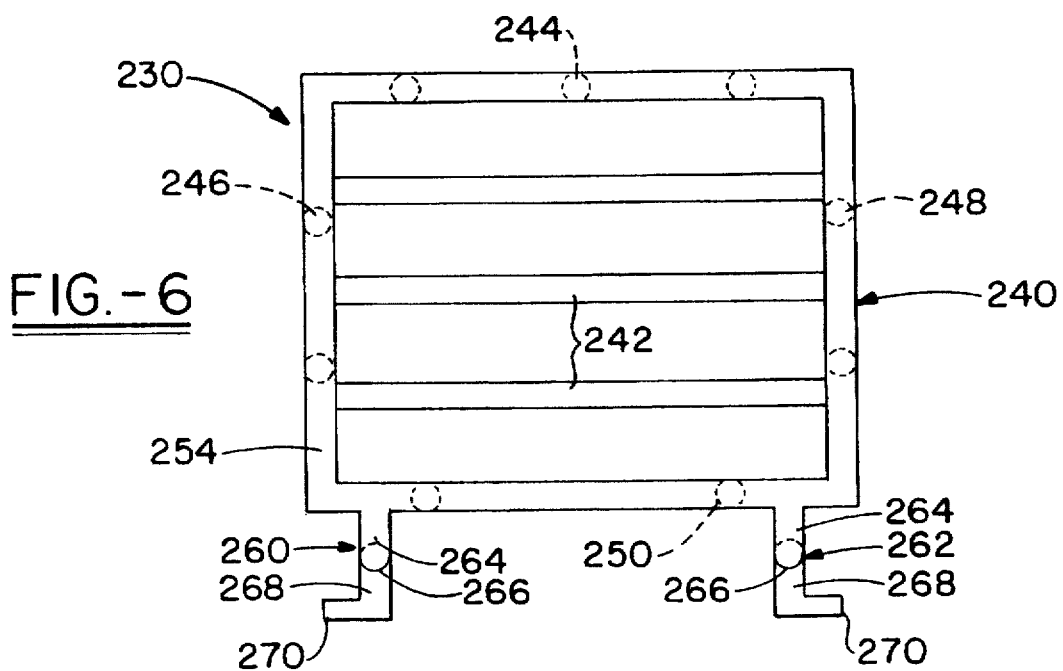
FIG. 6 is a top view of a wagon and a container according to another embodiment of this invention.
Figure 7:
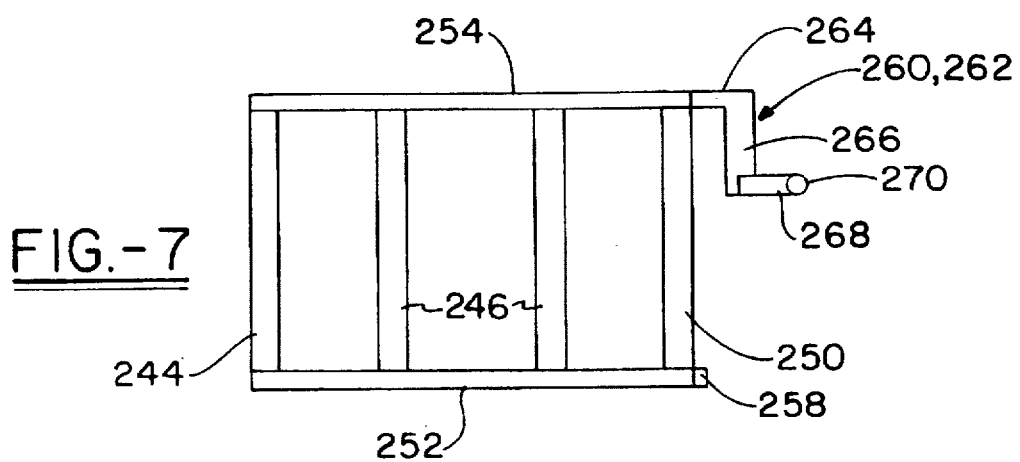
FIG. 7 is a side view of the container shown in FIG. 6.

FIGS. 6 and 7 illustrate a container assembly according to a further embodiment of this invention. The container assembly of this embodiment includes a container 230 for mounting to a vertical support surface such as the side wall of a wagon 80. Container 230 comprises a receptacle portion 40 and mounting means or an attachment portion 260.

Receptacle portion 40 of container 230 may be like the receptacle portion 40 of container 30 shown in FIGS. 1–4, and so the receptacle portion is not described in detail.

The mounting or attachment portion 260 of container 230 may be similar to the mounting or attachment portion 60 or 160 of previous embodiments, but may be more particularly configured for a predetermined wagon or vertical support surface. In general as shown, the two hooks 262 forming the attachment portion 260 may extend from and are axially aligned with the respective top runners 252, and can be made integrally therewith to simplify manufacture and assembly. Alternatively, the hook members 262 could be made to be selectively attached to the container 30. The hooks 262 may therefore lie in the respective planes of side walls 246 and 248. Each of the hooks 262 of this embodiment may further comprise a second horizontal and longitudinal portion 268, which extends from a lower end of vertical portion 266 outwardly (i.e., away from receptacle portion 40), and finally, a transversely extending horizontal portion 270, which extends transversely outwardly from an end of portion 268 and is adapted to extend through an opening in the side wall structure of wagon 80, such as shown in FIG. 1. In this manner, the hook members are positively attached to the structure of the wagon 80 to retain container 30 in the desired position relative thereto. The openings provided in many side wall constructions of wagons may therefore be capable of receiving the outermost portions 270 of the hooks 262 to aid in secure attachment of the container 30 to the wagon 80. The embodiment shown in FIGS. 6 and 7 is an example of a particular type of wagon for which the container 30 of the invention may be particularly suited for, and the container construction would allow hook members 262 of different configurations particularly suited for a particular wagon to be chosen and selectively attached to container 30 as a component thereof.

Variations and modifications in the structure of receptacle 40 shown in embodiments illustrated so far may be made. Thus, vertical corner posts may be provided if desired. Either horizontal slats or vertical slats (as shown) can form the side walls 44, 46, 48, and 50. When horizontal slats form the front wall 44 and rear wall 50, it is possible to dispense with the two transverse segments of either lower frame member 52 or upper frame member 54, or both, provided that the number of horizontal slats (at least two each for front wall 44 and rear wall 50) is sufficient to give the required rigidity to receptacle 40. Finally the longitudinally extending portions 64 of hook 62 (and the corresponding portions 164 and 264 in the embodiments of FIGS. 5, 6, and 7) may be axially aligned with the longitudinally extending segments of upperframe member 54 instead of being inwardly offset therefrom.

Figure 8:
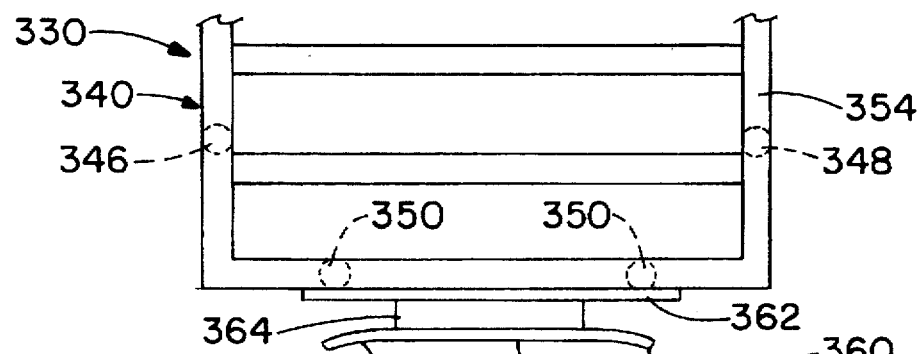
FIG. 8 is a fragmentary top view of a container according to a further embodiment of this invention.
Figure 9:
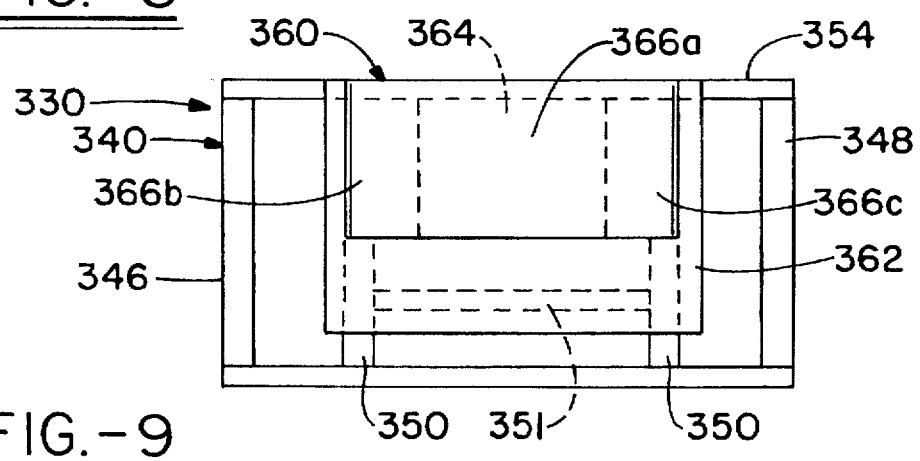
FIG. 9 is a fragmentary rear view of a container shown in FIG. 8.

FIGS. 8 and 9 are a partial top view and a partial rear view, respectively, of a container according to another embodiment of this invention. Container 330 comprises a receptacle portion 340, which may be identical or similar to the receptacle portion 40 of the first embodiment, and which will therefore not be described in further detail, and an attachment or mounting portion 360, which provides mounting means for mounting container 330 on a vertical wall surface, such as the rear wall of a hand-drawn wagon. Receptacle portion 340 of container 330 has a rear wall 350 which again may comprise a pair of spaced vertical slats and a horizontal slat 351 which extends between the vertical slats or the rear wall simply may be a solid or continuous wall. Attachment portion 360 in this embodiment may comprise an integral U-shaped channel opening downwardly which is attached to the rear wall 350 of receptacle 340. The attachment portion 360 may therefore have a portion 362 secured to or forming a part of rear wall 350, an outwardly extending horizontal portion 364 and a downwardly extending portion 366.

The portion 362 of attachment member 360 may be affixed to the horizontal slat 351 and the rear segment of top frame member 354 which form rear wall 350 or in any other suitable fashion. Further, if container 330 is molded as an integral unit, the attachment portion 360 may simply be made a part thereof. The portion 362 may have a top edge which essentially coincides with a top edge or an uppermost elevation of top frame member 354. The horizontal portion 364 extends outwardly form the top edge of the portion 362. The second sheet portion 364 may be slightly narrower than the first portion, as may be seen best in FIG. 8. Finally, portion 366 may extend downwardly either vertically or at a steep oblique angle from an outer edge of horizontal portion 364, and which is preferably wider than the horizontal connecting portion 364 which joins the portion 362 and 366. The downwardly extending portion 366 is adapted to form a seat back and may comprise a straight center section 366a and two curved side sections 366b and 366c. The two side portions 366b and 366c may be slightly curved away from the receptacle portion 340 to form a seat back, as best seen in FIG. 8. This configuration may also accommodate mounting on a wall having a curved surface, as, for example, the rear wall of the wagon 80 shown in FIG. 1. This embodiment allows a child seated in the wagon to rest against the seat back formed by member 366 to enhance the comfort of riding in the wagon as well as facilitating retention of container 330 on the wagon by the weight placed against the seat back formed. The present invention further contemplates forming a seat portion in association with the seat back on which a child riding in the wagon 80 could sit more comfortably and securely.

The containers according to each of the embodiments shown may be formed of the same thermoplastic materials and by the same molding techniques as are used to form a container 30 according to the first embodiment. Slats may be either round or rectangular (including square) in cross section, and may be either solid or hollow, as in the first embodiment. Containers 130, 230, and 330 can also be made of tubular steel, aluminum or other materials if desired.

Figure 10:
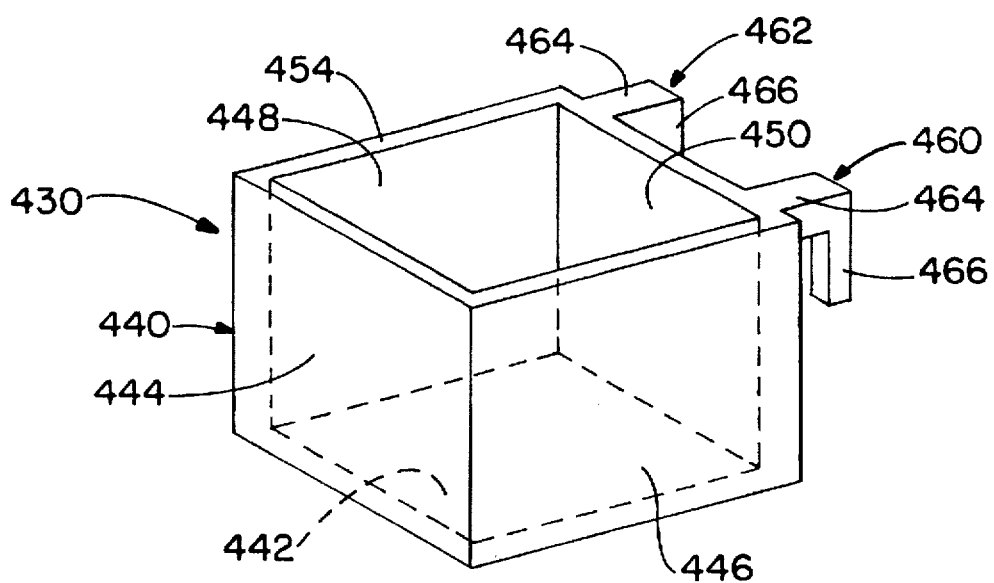
FIG. 10 is a perspective view of a container according to a fifth embodiment of this invention.
Figure 11:
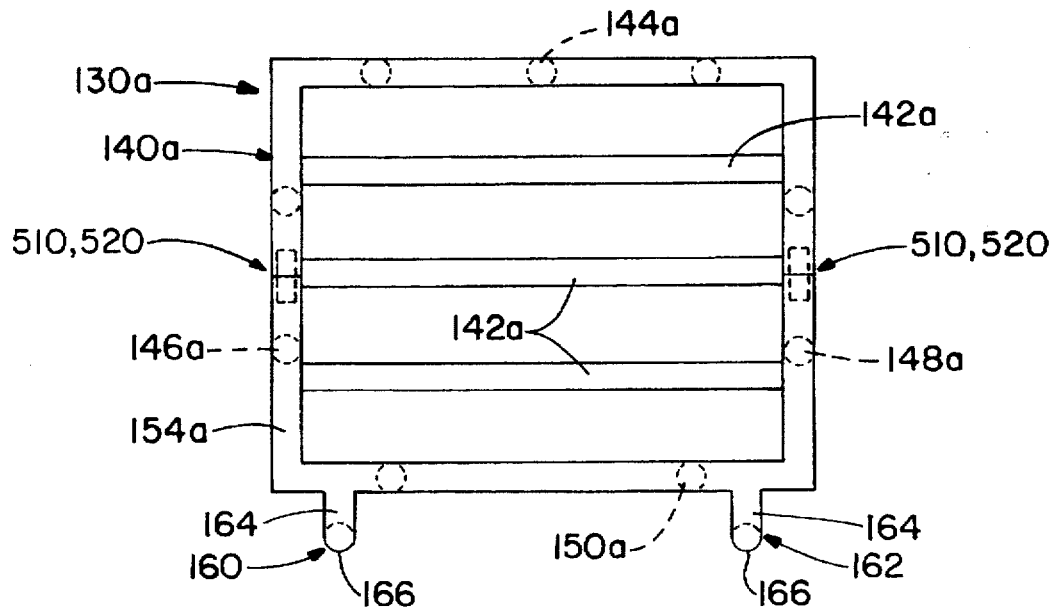
FIG. 11 is a top view of a first modification in accordance with this invention, showing a sectional open-frame container.
Figure 12:
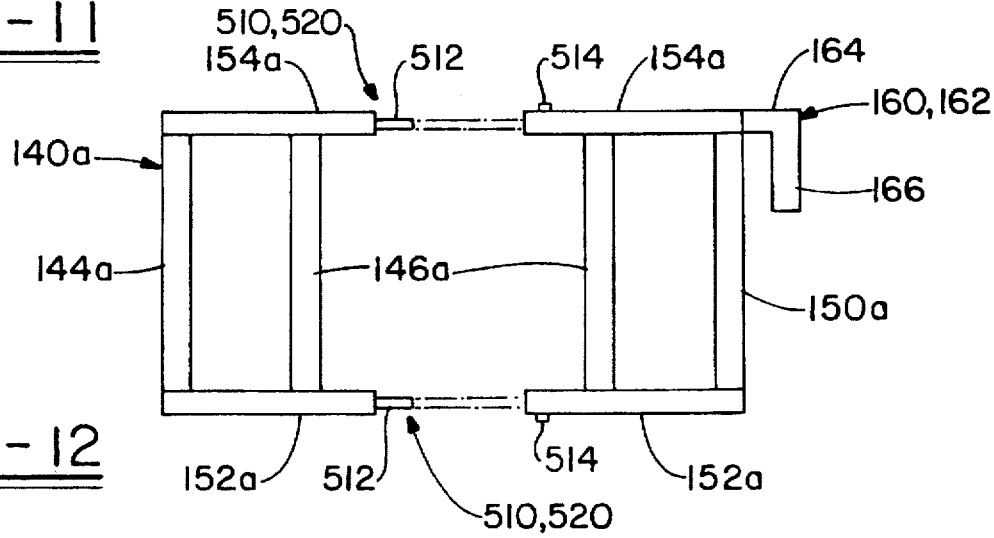
FIG. 12 is a side view of the modification shown in FIG. 11.

FIG. 10 illustrates a container 430 according to an embodiment of this invention. Unlike the open frame containers illustrated in the earlier embodiments, container 430 of this embodiment has solid or imperforate walls. Container 430 has a receptacle portion 440 of rectangular shape and comprising a horizontal bottom wall 442 and vertical side walls, i.e., a front wall 444, parallel longitudinally extending side walls 446 and 448 and a rear wall 450. These side walls may be of the same height so as to form a horizontal and essentially planar top edge or rim 454.

Container 430 has mounting means or an attachment portion 460, which can be similar to any of the embodiments as described. In the embodiment as shown, the attachment portion 460 comprises a pair of spaced parallel hooks 462 which extend from rear wall 450 away from the receptacle portion 440. These hooks may extend from the side edges of rear wall 150 just below the top edge 454 as shown. These hooks each comprise a horizontal portion 464 which is integrally formed with the receptacle 440 and a vertical portion 466 extending downwardly from an end of horizontal portion 464 which is remote from the receptacle 440. Again, the structure of the attachment portion 460 of this embodiment may be generally similar to any of the embodiments as shown herein.

The embodiment of FIG. 10 is preferably produced by conventional molding techniques using any of the same thermoplastic materials as have been described with reference to earlier embodiments or may be produced in any suitable manner with any suitable material.

FIGS. 11 through 25 describe various modifications of containers according to this invention. In general, and except as otherwise indicated, each of these modifications is applicable to any of the basic embodiments disclosed so far; although, for purposes of illustration, each will be disclosed with particular reference to one or another of the previously disclosed basic embodiments.

A first modification will be disclosed with particular reference to FIGS. 11 through 14. According to this modification, the receptacle portion of an open-frame container is formed in separable sections, which as shown may be two separable sections or any other number thereof. While this modification is applicable to any of the embodiments, it will be disclosed with particular reference to a modification of the first embodiment, shown in FIGS. 1–4, for illustrative purposes.

The modification of FIGS. 11 to 14 provides a receptacle portion which is sectional and may be composed of modular sections which allow it to be lengthened, shortened, or otherwise configured to facilitate its use for a particular application if needed or desired. In FIGS. 11–14, container 130a comprises a sectional, open-top receptacle portion 140a and a mounting or attachment portion 160. Since the receptacle portion 140a may be the same as in any of the previous embodiments, similar reference numerals are used as in the embodiment of FIG. 5 for purposes of illustration.

The receptacle portion 140a may be formed in two separable sections and comprises a bottom wall 142a, a front wall 144, longitudinal side walls 146a and 148a, and a rear wall 150.

The receptacle portion 140a further includes a rectangular bottom frame member 152a, and a rectangular top frame member 154a, each of which is made in two separable, generally U-shaped sections. The sections may be joined together by joints of identical or similar structure (two in each of the two lower frame members 152a and two in each of the two upper frame members). These joints will be in the form of joint 510, shown in FIG. 13, when the frame of the receptacle 140a is of hollow tubular construction, and will be in the form of joint 520, shown in FIG. 14, when the frame members are of solid construction.

Figure 13:
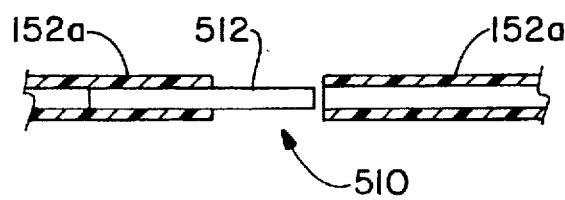
FIGS. 13 and 14 are fragmentary sectional views of joints for a sectional container as shown in FIGS. 11 and 12.

Referring now to FIG. 13, when the frame members 152a and 154a are of hollow tubular construction, a joint 510 may comprise a cylindrical pin 512, preferably of a strong, rigid material, which is integral to or joined to one of the sections (say the forward section, as shown) of frame 152a (or 154a). A portion of the pin 512 protrudes from the open end of the forward section of frame 152 (or 154a), and is received in an open end of the rearward portion of the frame 152a (or 154a). A securing mechanism such as a set screw 514, received in a threaded socket in the rearward portion of the frame, may be used for tightening and thereby holding the two sections of frame members 152a and 154a in place. Other methods or structures to assemble the sections together are also contemplated and would occur to persons of ordinary skill in the art.

Figure 14:
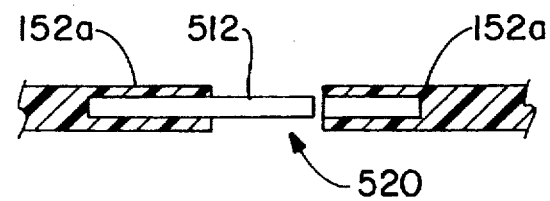
Figure 15:
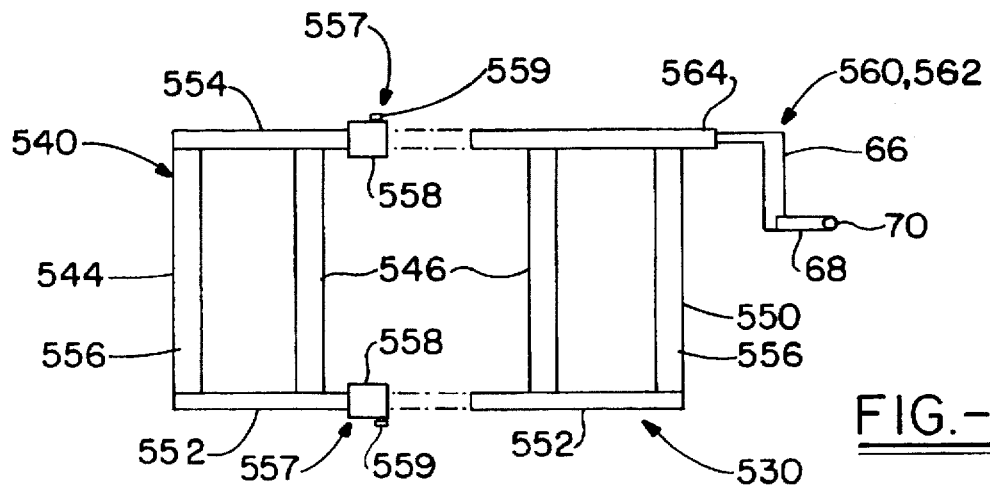
FIG. 15 is a side elevational view of a further modification of this invention, showing a container having a sectional frame and an extensible attachment hook permitting the container to be mounted on walls of different thicknesses.

When the frame members 152a and 154a are of solid cross-sectional shape (and typically formed of a molded thermoplastic) the joint construction shown in FIG. 14 is used in this case, a joint 520 comprises a metallic pin 512 (which may be of the same structure as shown in FIG. 13), which is embedded in a matrix of thermoplastic in the forward section of the frame member 152a (or 154a). The rearward portion of each frame member 152a and 154a has a socket surrounded by an annular sleeve of thermoplastic material, for receiving a free end of the pin 512.

FIGS. 13 and 14 show free end portions of lower frame member 152a as being received in a joint 510 (FIG. 13) or 520 (FIG. 14). Since the horizontal free end portions of upper frame member 154a are identical to the corresponding portions of lower frame member 152a, it will be apparent that FIGS. 13 and 14 also illustrate the joints for holding the two sections of an upper frame member 154a together. The parenthetical expressions "or 154a," denote that the joint structures for lower frame member 152a and upper frame member 154a are identical, but that the latter does not actually show in FIGS. 13 and 14.

The bottom wall 142a of container 130a may be formed by open rectangular bottom frame 152a which has a pair of sectional parallel longitudinal sides or segments and a pair of parallel transverse sides or segments, and a plurality of horizontal transverse slats which extend from one of the longitudinal segments to the other of bottom frame 152a. The longitudinal side walls 146a and 148a are each formed by vertical slats which extend between the bottom frame member 152a and the top frame member 154a. The front wall 144a and the rear wall 150a may have the same structure as their counterparts 144 and 150, respectively, such shown in FIG. 5.

Similarly, the top frame member 154a has two separate, generally U-shaped sections each of which comprises a transverse side or segment of the frame and a portion of each of the longitudinal sides or segments of the frame member. A pair of longitudinally extending pins 512 are received in and protrude from free ends of one of the longitudinal segments of upper frame member 154a. The free ends of the longitudinal segments of the other portion (say the rear portion) of upper frame member 154a) have annular sockets to receive the protruding portions of pins 512. The structure of the upper frame member 254a is essentially the same as that of the lower frame member 252a.

It is possible to lengthen the receptacle portion of container 130a by using additional or different sized sections or by providing adjustment by means of adjusting the position of the pins 512 within the sockets in the rearward portions of bottom frame member 152a and the upper frame member 154a for example, in a telescoping configuration. It is desirable to place vertical slats forming side walls 146 and 148 close to the joints 510 or 520 for structural integrity, so as to not to leave a large gap between adjacent vertical slats near the joints. If some degree of adjustability in the width of a container is desired, it is possible to provide sectional transverse segments of lower frame member 152a and upper frame member 154a. The joints may be similar to those illustrated in FIGS. 12 through 15.

FIGS. 15 through 18 illustrate a second modification in accordance with this invention. This modification illustrates an open-frame container 530 having an adjustable sectional receptacle portion 540 and an adjustable attachment portion or mounting means 560. As will be apparent from the description which follows, the receptacle structure shown in FIGS. 9–12 may be applied to any of the embodiments herein.

It will also be apparent that a container in accordance with this invention may incorporate either the sectional receptacle portion 540 or the adjustable attachment portion 560 without incorporating the other, if desired.

Receptacle 540 may be an open-top receptacle comprising a bottom wall 542, a front wall 544, a first longitudinal side wall 546, a second longitudinal side wall which is not visible in the Figs., and a rear wall 550.

Figure 16:
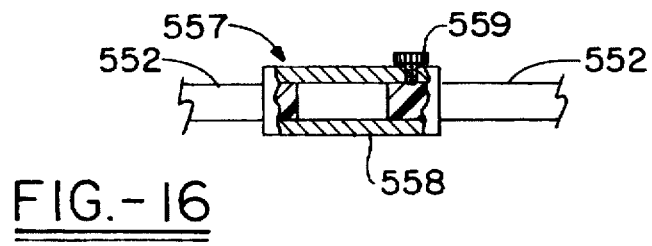
FIG. 16 is an enlarged fragmentary view of a sectional joint shown in FIG. 15.

For purposes of illustration, container 530 comprises a receptacle portion 540 which has a rectangular (and therefore four-sided) bottom frame member 552 which extends around and defines a perimeter of the bottom wall 542; a rectangular (and therefore four-sided) top frame member or rim 554, which defines the top edges of the side walls 544–550; and upright frame members 556, which extend from the respective four corners of the bottom frame member 552 to the corresponding corners of the top frame member 554. It will be apparent that these upright frame members 556 also define intersections between adjacent side walls. The bottom frame member 552 and the top frame member 554 each comprises a pair of generally U-shaped sections, with joints 557 which permit these sections to be releasably joined together. The joints are formed in longitudinal sides or segments of the frame members. As shown in FIG. 16, each joint 557 comprises a sleeve 558 which overlies end portions of the frame members 552 and 554. The sleeves 557 may each be secured to one of the two sections, e.g., the front section of the frame member as shown in FIG. 16. The free ends of the other section (say the rear section) of the frame members 552 and 554 may be releasably received in sleeves 558 as shown in FIG. 16. This type of joint permits for slight adjustability in the length of the receptacle portion 540 of container 530. As shown in FIG. 16, a slight extra length is obtained by not placing the sections of frame members 552 and 554 in abutting relationship. When the free ends of frame sections 552 and 554 are in abutting relationship, the length of receptacle portion 540 is at a minimum.

Figure 17:
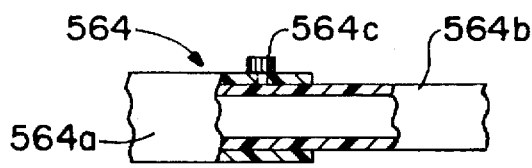
FIG. 17 is a fragmentary elevational view, partly in section, of a portion of the extensible attachment hook shown in FIG. 15.

The attachment portion 560 of receptacle 530 may be made adjustable to accommodate walls or other supporting structures of different thicknesses. Referring now to FIGS. 16 and 17, attachment portion 560 of receptacle 530 has a pair of spaced hooks 562. Each hook 562 has a telescoping horizontal arm 564, which comprises two sections including a flat portion 564a, which is affixed to the receptacle portion 540 of container 530, and a second portion 564b, which is of slightly smaller diameter or size than that of portion 564a so that it telescopes within section 564a. Each hook 562 further comprises a downwardly extending portion 66, which may be like the corresponding structure 66 shown in FIGS. 1–4, and optionally also a horizontal longitudinal section 68 and a horizontal transverse and outwardly extending segments 70, similar to the counterparts shown in FIG. 5. The later two sections 68 and 70 are frequently not necessary and may be omitted. A set screw 564c holds the two telescoping sections 564a and 564b in place.

Figure 18:
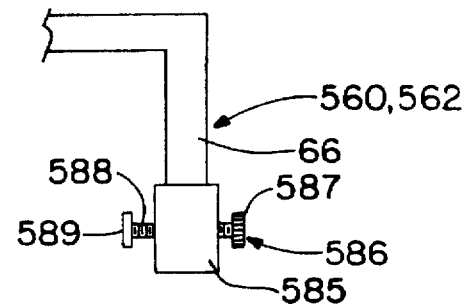
FIG. 18 is a fragmentary elevational view of an end portion of an attachment hook showing a structure for gripping a wall.

FIG. 18 illustrates a further modification which is useful in securing an attachment portion 560 of a container 530 to a wall or other supporting structure. Only part of the attachment structure 560 is shown in FIG. 18. Shown are a horizontal portion 564 and a vertical descending portion or segment 66. Segment 66 is illustrated as being the outermost portion of a hook 562; that is, segment 68 and 70 are omitted. A sleeve 585 is placed over the outer (an lower) end of segment 66 of hook 562. The sleeve is provided with an adjusting screw 586, which comprises a head 587, a shank 588 and a plate 589 formed on the end of shank 588 which is remote from head 587. The plate 589 is adapted to engage a support surface, as for example an inside surface of a rear wall 88 of a wagon 80. The adjusting screw 586 may be adjusted until the plate 589 firmly engages the support surface. This structure provides for a tight engagement of a support surface and is especially useful when the support surface is vertical and has at its upper end a rim or lip which is thicker than the wall as a whole.

Figure 19:
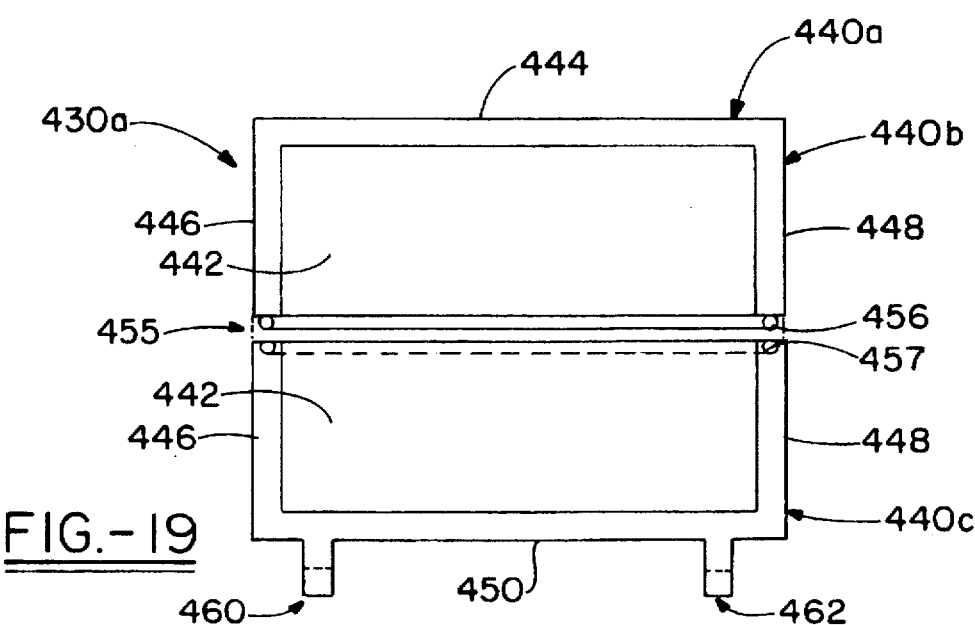
FIG. 19 is a top view of a modification according to this invention, illustrating a solid-wall container having a sectional frame.
Figure 20:
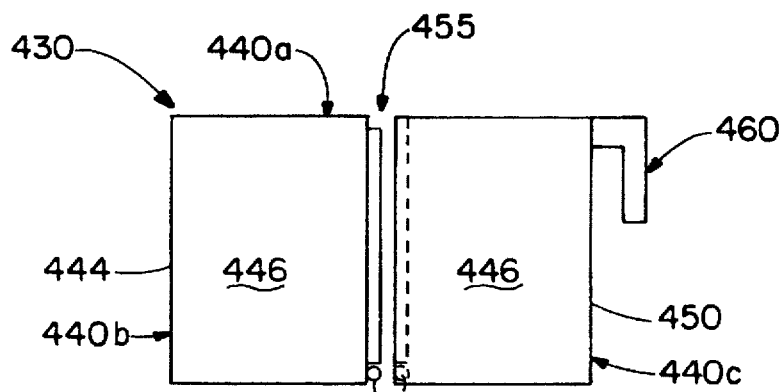
FIG. 20 is a side elevation of the modification shown in FIG. 19.

FIGS. 19 and 20 show a container 430a having a sectional receptacle 440a in accordance with a further modification of this invention. This modification will be illustrated with particular reference to a container having imperforate bottom and side walls, similar to that shown in FIG. 10. Referring now to FIGS. 19 and 20, container 430a comprises a sectional receptacle portion 440a and an attachment portion 460. The sectional receptacle portion 440a is formed in two sections 440b and 440c, which are releasably secured to each other. Sectional receptacle portion 440a includes a sectional bottom wall 442, sectional side walls 446 and 448, an imperforate front wall 444 which is part of section 440b, and an imperforate rear wall 450 which is part of section 440c.

A generally U-shaped joint 455 extends along the parting line of bottom wall 442 and side walls 446, 448. Joint 455 comprises a mating tongue 456 and groove 457. Tongue 456 and groove 457 are of generally circular shape, each comprising slightly more than one-half circle and are of the same diameter. Tongue 456 may be formed of a resilient material, such as rubber or a thermoplastic elastomer, which is bonded to the edges of the bottom wall 442 and side walls 446, 448. The tongue 456 may be received in the groove 457 via a snap action fit. The joint 455 illustrated is merely illustrative; other suitable joints may be used. The mounting means or attachment portion 460 of container 430 may be similar to any of the attachment mechanisms shown herein.

Figures 21, 22:
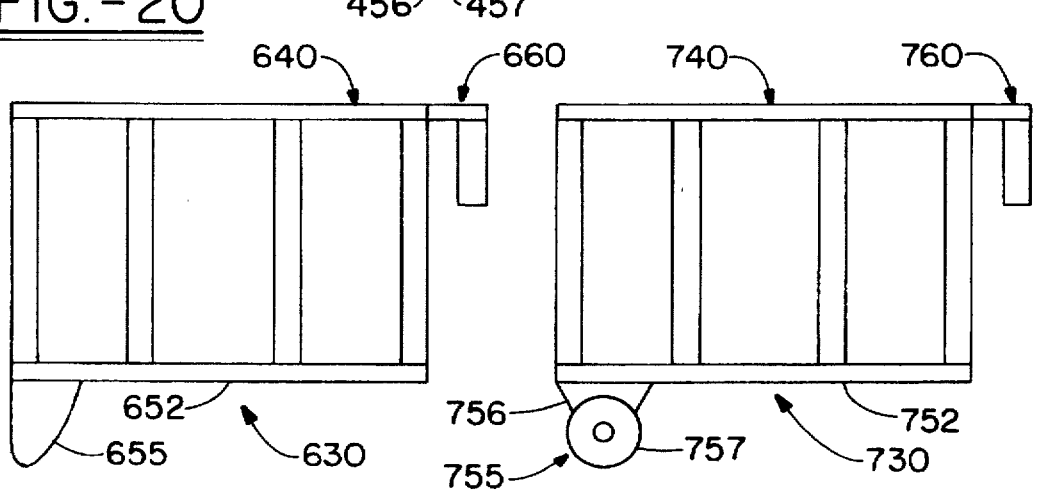
FIG. 21 is a side elevational view of a container according to this invention including a first structure for preventing tipping.
FIG. 22 is a side elevational view of a container according to this invention including a second structure for preventing tipping.

FIGS. 21 and 22 show further modifications in which a container in accordance with this invention is provided with means for supporting the container so that it will not tip over or cause the supporting surface such as a wagon to tip over. It should be recognized that in use with a wagon, if substantial weight is carried in the container of the invention, this could result in tipping the wagon over, particularly if any children sitting in the wagon get out. FIG. 21 shows a container 630 comprising a receptacle portion 640 and a mounting or attachment portion 660. The container 630 may be in accordance with any of the embodiments of the invention and so is not shown or described in detail. For purposes of illustration, the container 630 is shown as being of the open-frame type. Extending downwardly from the forward end of the receptacle portion of container 630, and specifically from the two longitudinal segments of lower frame member 652 at the respective forward ends thereof, are feet 655, which are spaced apart and situated on the right and left sides of the receptacle 640 at the forward end thereof. If the receptacle portion 640 of the container 630 is more heavily loaded than the wagon on which the container is mounted, the container assembly comprising container 630 and the wagon would tend to tip backwards. The feet 655 prevent this.

Another modification, also for preventing a container assembly from tipping backwards, is show in FIG. 22. In FIG. 22, a container 730 according to this invention is shown, having a receptacle portion 740 and a mounting or attachment portion 760. Container 730 may be in accordance with any of the embodiments of this invention and so is not shown or described in detail. For purposes of illustration, container 730 is illustrated as being of the open-frame type. Extending downwardly from the container frame and specifically from longitudinal segments of the lower frame member 752 at the front end of the container are a pair of wheel assemblies 755, each of which comprises a hanger 756 which is either fixed to or integrally joined with the container frame, and a wheel 757 rotatably mounted therein. Only one of these wheel assemblies 755 is visible in FIG. 22, but if two wheel assemblies 755 are used, they may be identical and are laterally spaced apart.

Figure 23:
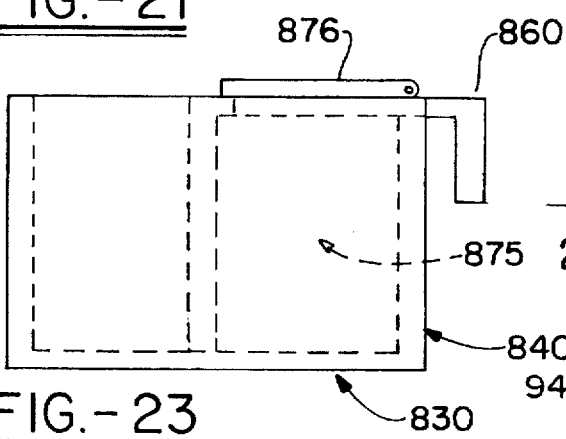
FIG. 23 is a side elevational view of an assembly comprising a wagon and a container according to this invention wherein the container includes a cooler.

FIG. 23 shows a further modification according to this invention, in which a container of this invention is modified to include on-board beverage cooler. Container according to this modification can be any of the embodiments heretofore illustrated, and a container, similar to that shown in FIG. 10 is used for purposes of illustration. Container 830 comprises a receptacle portion 840 and a mounting or attachment portion 860. The receptacle portion may be of rectangular shape and open at the top. This receptacle portion comprises four side walls, i.e., two longitudinal side walls and two end walls (a front wall and a rear wall). A built-in cooler 875 may be provided in part of the receptacle portion 840 of container 830. This built-in cooler is preferably of rectangular shape, comprising a bottom wall and four upstanding side walls, and a pivotally mounted lid 876 at the top.

Figure 24:
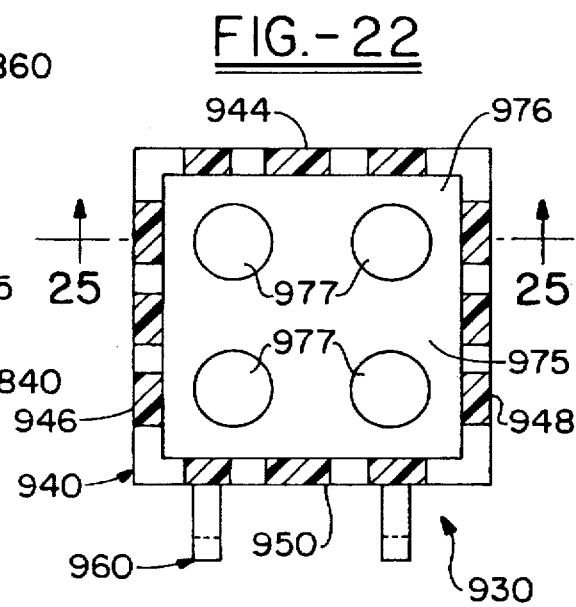
FIG. 24 is a top plan view, shown partly in section, of a lower of a container provided with a cup holder in accordance with this invention.
Figure 25:
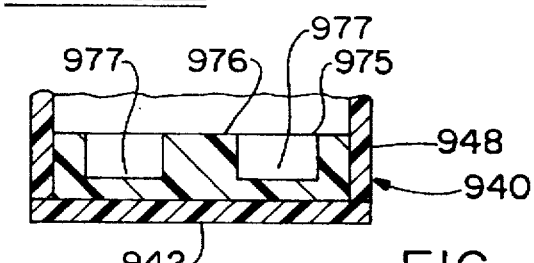
FIG. 25 is a vertical sectional view taken along line 25—25 of FIG. 24.

FIGS. 24 and 25 show yet another modification in accordance with this invention. There is shown a container 930 comprising a receptacle portion 940 and a mounting portion 960. Container 930 is illustrated as being of molded plastic and comprising an open top receptacle portion 940 and a mounting or attachment portion 960 which is integrally joined to the receptacle portion. The receptacle portion is square in shape and comprises a bottom wall 942 and four vertical side walls, including a front wall 944, longitudinal side walls 946 and 948 and a rear wall 950. The bottom wall 942 may be formed of a square, open frame with a plurality of parallel slats of rectangular cross-sectional shape extending between two opposite sides of the frame. Each of the side walls may be formed by one side or segment of the bottom open frame and a plurality of parallel vertical slats of rectangular cross-sectional shape which extend upwardly from the bottom open frame to a top open frame or rim (not shown). The receptacle portion 940 of container 930 is provided with a cup holder 975, which may be either removable or built in. In either case, the cup holder 975 may comprise a block or matrix 976 of thermoplastic material having formed therein a plurality of circular recesses 977 for holding cups or beverage cans or the like. The cup holder construction may also be formed in conjunction with the lid of cooler 875 such as shown in FIG. 23.

It will be apparent that the present invention materially expands the usefulness of a multi-purpose, hand-drawn outdoor wagon, and, in particular, enhances the utilitarian aspects of such wagon. While this invention has been described with reference to specific embodiments and modifications thereof, it shall be understood that such description is by way of illustration and not by way of limitation, and therefore various additional embodiments and modifications can be made by those skilled in the art without departing form the scope and spirit of this invention.

What is claimed is:

1. A portable accessory container mounted to a rear vertical support member of a wagon, said container having opposite first and second sides and an upper edge, said container comprising:

(a) a receptacle comprising an essentially horizontal bottom and upstanding sidewall means extending upwardly from and around a periphery of said bottom and terminating in a top edge, said bottom and said side wall means defining an interior space for receipt of articles;

(b) mounting means for detachably mounting said container on said rear vertical support member, said mounting means comprising a pair of spaced parallel hooks extending from spaced points on an upper portion of said side wall means;

(c) each said hook comprising a horizontal portion extending from an outside surface of said sidewall means and a downwardly extending vertical portion which extends downwardly from said horizontal portion, said horizontal portion including a rigid member which is integrally joined to said sidewall means;

said downwardly extending vertical portion further comprising a horizontal extending means which is at least partially engageable with a hole in at least one upstanding sidewall of said wagon; and (d) said container being adapted to be mounted on said support member so that said receptacle and said downwardly extending portion of each said hook are disposed on opposite sides of said support member and said horizontal portion of each said hook extends above an upper edge of said vertical support member.

2. A container according to claim 1 wherein said side wall means comprise a front wall, a rear wall and side walls, and wherein said rear wall is adapted to be mounted in proximity with said vertical support member.

3. A container according to claim 2 wherein said base is rectangular and said front wall, said rear wall, and said side walls are each essentially planar.

4. A container according to claim 3 wherein said receptacle has an open top.

5. A container according to claim 3 wherein said side wall means of said receptacle have a top edge which is parallel to said bottom, so that the height of said receptacle is essentially uniform.

6. A container according to claim 3 wherein each hook extends outwardly from said rear wall near said top edge.

7. A container according to claim 3 wherein said bottom and said side walls are of open frame construction.

8. A container according to claim 3 wherein said bottom and said side walls are imperforate.

9. A container according to claim 1 wherein said horizontal portion of each hook has telescoping first and second members, said first member being integrally joined to said receptacle.

10. A container according to claim 1 wherein said container includes means from a lower part of said vertical portion of said hooks for engaging said support member.

11. A container according to claim 1 wherein said support member is a wagon having four wheels, a floor, and upstanding side walls and back wall extending upwardly from said floor.

12. A container according to claim 11 wherein said container is secured to a back wall of said wagon.

13. A container according to claim 12, said container including means extending downwardly from said base of said receptacle for preventing tipping of said wagon.

14. A container according to claim 12, including means associated with said vertical portion of each hook for securing said container to said back wall of said wagon.

15. A container according to claim 1, further including cup holders positioned within said interior space of said receptacle.

16. A container according to claim 1, further including a built-in cooler in said interior space of said receptacle.

17. A container according to claim 1 wherein said engaging means on opposed sides of the vertical support member further comprises a pair of parallel hooks extending from spaced points on an upper portion of said side wall means; and further wherein each said hook comprises a horizontal portion extending from an outside surface of said sidewall means and a downwardly extending vertical portion which extends downwardly from said horizontal portion, said horizontal portion including a rigid member which is integrally joined to said wall means.

18. A container according to claim 12 wherein said horizontal extending means are provided with each of said hooks so as to be engageable with at least two upstanding sidewalls of said wagon.

19. A portable accessory container for mounting on a vertical support member having opposite first and second sides and an upper edge, said container comprising:

(a) a receptacle comprising an essentially horizontal slatted bottom wall and upstanding slatted side wall means extending upwardly from and around a periphery of said bottom wall, said side wall means terminating in a top edge, said bottom wall and said side wall means defining an interior space for receipt of articles;

(b) said bottom wall comprising a pair of spaced, parallel horizontal frame members and a plurality of slats extending perpendicular thereto; said side wall means comprising a plurality of essentially vertical side walls, each said side wall comprising a pair of spaced, parallel frame members and a plurality of spaced, parallel slats extending between said frame members; and (c) mounting means integrally joined to said receptacle portion at a top edge of said side wall and extending over an upper edge of a supporting structure, said mounting means including a downward extension from a portion of the mounting means which extends over said upper edge of said supporting structure and a horizontal extending means which is at least partially engageable with a hole in at least one upstanding sidewall of said wagon.

* * * * *